Sept. 2, 1958  J. D. SAINT-AMOUR  2,850,683
AMPLIFIER CIRCUIT USING A CONTACT METER
Filed April 29, 1957
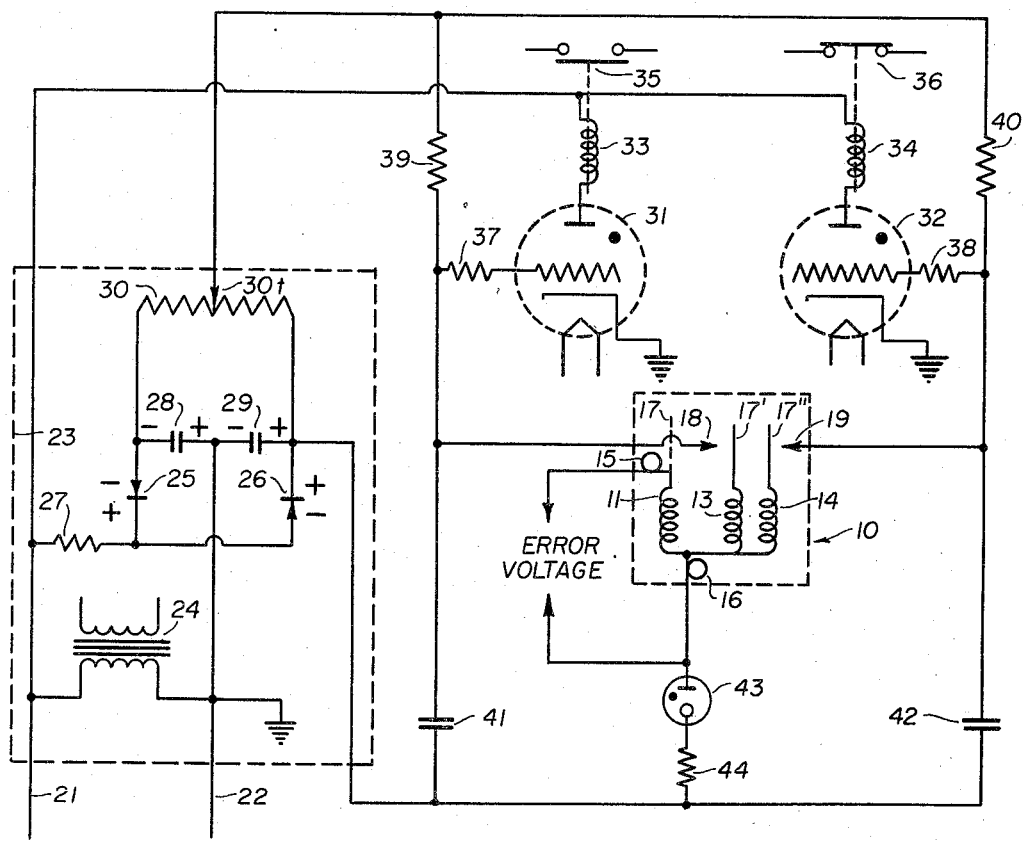
INVENTOR.
JOHN D. SAINT-AMOUR
BY Richard H. MacCutcheon
ATTORNEY

United States Patent Office 2,850,683
Patented Sept. 2, 1958

2,850,683

AMPLIFIER CIRCUIT USING A CONTACT METER

John D. Saint-Amour, Chagrin Falls, Ohio, assignor to Assembly Products, Inc., Chesterland, Ohio, a corporation of Ohio Application April 29, 1957, Serial No. 655,657

2 Claims. (Cl. 317—149)

This invention relates to improvements in electrical control systems and has particular significance in connection with servo mechanisms and other controls utilizing galvanometer type meter relays provided with contacts and of the type having a sensitive coil and one or more booster or locking coils to add a contact closing force additional to that of the sensitive coil, which force is later broken for quick break-away of the contacts. The present invention relates to improved means for breaking said force.

It has heretofore been known to provide a contact making galvanometer type of instrument having a sensitive coil and a booster coil for the purpose of increasing the pressure between the contacts locking them together when they first meet as described, for example, in Patent 2,576,371, issued November 27, 1951, upon an application filed by Bradley R. Thompson and George F. Hammond. As disclosed in that patent, a method used to interrupt the locking action (once the contacts have in effect locked themselves together by completing a circuit through the locking coil) is to use a circuit opening cycling device, such as a relay that periodically breaks a set of relay contacts placed in series with the locking coil and meter relay locking contacts. While this expedient has worked out in practice for some applications, in many applications it requires a plurality of relays and an abundance of associated apparatus which is expensive from a first cost and from a maintenance standpoint, and such arrangements are further disadvantageous in being relatively slow in action.

Further it has been known to have arrangements by which the locking contact energizes a load relay having its own holding circuit periodically interrupted by a motor driven cam switch in such manner as to provide shorting out the locking-coil-locking-contact circuit, but again moving parts are utilized, they wear out, and are relatively slow in response in any event.

It is an object of the present invention to provide simple and inexpensive means for overcoming the abovementioned difficulties.

Another object of the invention is providing a proportioning circuit including an interruptor and having no moving parts.

Another object of the invention is to provide an improved electrical system of the type adapted to be used both as control and as an indicator, as for industrial load operations, and which is characterized by low cost of construction, ease of maintenance, and extremely rapid operation.

Other objects and advantages will become apparent and the invention may be better understood from consideration of the following description taken in connection with the accompanying drawing, in which:

The single figure is a diagrammatic illustration of an improved electrical control and indicating system according to the invention.

Referring now to the drawing, my improved system includes a moving coil type of electrical indicator shown diagrammatically at 10 and assumed provided with a permanent magnet (not shown) reactive to which a sensitive coil indicated diagrammatically at 11 turns responsive to changes in a quantity for simplicity regarded as an input or error voltage.

Mounted to rotate with coil 11 are two locking coils 13—14 which provide, one for either limit of travel, an additional or boosting or locking torque as more fully described and claimed in copending application, Serial No. 591,940, filed June 18, 1956, in the name of Bradley R. Thompson and the present applicant.

As described in the patent to Thompson and Hammond, the coil assembly may be mounted on steel pivots and turn in jewelled bearings responsive to interaction of coil current and permanent magnet field with this action restrained by hair-springs, two of which, as indicated diagrammatically at 15 and 16, may serve also to carry current to and from the moving coil assembly.

For clarity in the simplified diagram three pointers 17, 17', and 17'' are shown in the drawing, although those in the art will understand that ordinarily a single pointer is used both for indicating and for carrying mutually insulated contacts connecting with the respective locking coils. Thus 17' may in reality be a portion of the pointer associated with coil 13 and designed to mate with a low limit relatively stationary contact 18, and 17'' represent a contact associated with locking coil 14 and designed to mate with a relatively stationary high limit contact 19.

In the illustrated embodiment, lines 21, 22 may be assumed to be from A. C. source of power and feeding a more or less conventional power supply which, as shown within the block 23, comprises a filament supply transformer 24 and a D. C. grid (and contact meter locking circuit) supply having oppositely directed rectifiers 25 and 26 fed from line 21 through a condenser charging current limiting resistor 27 and with condensers 28, 29 connecting from the opposite sides of the respective rectifiers back to line 22. Good results have been obtained using a 47 ohm resistor at 27, and condensers 28 and 29 may each be one mfd. The resultant output is taken through a 100,000 ohm potentiometer 30 provided with a variable tap, 30–t, affording a sensitivity control and operable from plus to minus and through a zero (ground potential) point.

Thus, with respect to cathodes which are grounded, variable voltage D. C. is supplied to the grids of two gas-filled thyratron amplifier tubes 31—32, while the plates thereof respectively operate the coils 33—34 of A. C. load relays having respective contacts 35—36 operating in circuits (not shown) to provide a considerably amplified error-correcting output. Series grid resistors 37—38, respectively, each may be 2.2 megohms, and provide grid bias drop, while resistors 39—40, respectively, each 330,000 ohms, are connected into the supply with the juncture point between 39—37 on the one side, and 40 and 38 on the other, thus also arranged to control voltagewise the grid voltages but dependent on voltage across a 0.5 mfd. shunt condenser (41 or 42) arranged around the circuit of the associated locking coil-locking contact circuit in series with a neon negative glow-lamp 43 and arranged in series with a 4700 ohm resistor 44, as shown.

As hereafter explained, the glow-lamp and its resistance and the respective contact meter locking coil circuit are thus shunted across one or the other of the two capacitors 41—42 in such manner that the glow-lamp will flash at a frequency depending on circuit constants to cause locking coil circuit interruption as is desired in order that the meter will again respond to sensitive coil current.

In operation, the sensitivity control 30-t is so adjusted that the thyratrons will not conduct until the meter relay contacts 17'—18 or 17'—19 close, but so that upon closing the balance is disturbed sufficiently to cause the appropriate tube to conduct and the associated relay to operate while the heretofore charged capacitor (41 or 42) will tend to discharge through the circuit of the closed meter contacts and associated locking coil (13 or 14) and neon glow tube 43 until eventually the glow tube circuit will break down. The frequency of interrupton will depend not only upon the L-R constants including response time of the meter, but also upon the applied voltage which in the illustrated case is determined by the sensitivity control 30—30-t but this causes no complications and is actually advantageous, as is the fact that the meter contacts break no load currents.

There is thus provided apparatus of the type described capable of meeting the objects above set forth, and including novel means for de-energizing a locking coil-locking contact portion of a contact meter circuit without dropping the controlled load, and without flashing of the delicate meter locking contacts, but while providing an action which is faster and more economical both from a first cost and from a maintenance standpoint than would be the case were resort to be had entirely to relays, either solenoid or cam-motor operated.

While I have illustrated and described a particular embodiment, various modifications may obviously be made without departing from the true spirit and scope of the invention which I intend to define in the appended claims.

I claim:

1. An electrical control system comprising in combination a galvanometer type meter having contacts and having a sensitive coil and at least one locking coil connected in the circuit of one of the contacts to add a contact closing force additional to that of the sensitive coil, voltage supply means for energizing the locking coil circuit when the contacts are closed, and means including a neon glow lamp in series between the voltage supply and the locking coil for periodically interrupting the voltage supply means and locking coil and contact circuit to periodically render the meter sensitive to sensitive coil current alone.

2. An amplifier circuit comprising a contact-making galvanometer type instrument having a rotatable position part carrying a sensitive coil and additionally carrying a locking coil and carrying contact means connected in series with said locking coil, said galvanometer having a relatively stationary limit contact arranged to co-operate with said rotatable carried contact means to establish a circuit for one limit of travel of the rotatable carried means, a source of power, means including connections for applying said power to the circuit of locking coil and contacts when the rotatable contact means is closed against the relatively stationary limit contact, a neon glow discharge lamp interposed in the circuit of said connections for periodically interrupting the locking coil circuit, a capacitor arranged in shunt around the neon glow discharge lamp when the locking contacts are closed, a vacuum triode amplifier having a cathode, an anode and a control grid, means including connections from the source of power for oppositely energizing said cathode and anode while energizing said grid more or less with respect to cathode-anode voltages by interposing it electrically in the circuit from voltage source to shunt capacitor and contact meter locking coil and contact circuit including the series connected neon glow discharge lamp, an output comprising controlled means interposed in the anode circuit of the vacuum triode, and an input including an error voltage for energizing the sensitive coil of the galvanometer, whereby the galvanometer may be automatically rapidly put under the sole control of the sensitive coil during time when its contacts are closed without the introduction of moving parts and without intermingling of coil locking and controlled means currents.

References Cited in the file of this patent

UNITED STATES PATENTS

| | | |
|---|---|---|
| 2,575,951 | Gilbert | Nov. 20, 1951 |
| 2,576,371 | Thompson | Nov. 27, 1951 |